(12) United States Patent
Muchherla et al.

(10) Patent No.: US 11,789,629 B2
(45) Date of Patent: *Oct. 17, 2023

(54) SEPARATE PARTITION FOR BUFFER AND SNAPSHOT MEMORY

(71) Applicant: Micron Technology, Inc., Boise, ID (US)

(72) Inventors: Kishore K. Muchherla, Fremont, CA (US); Niccolo' Righetti, Boise, ID (US); Jeffrey S. McNeil, Jr., Nampa, ID (US); Akira Goda, Boise, ID (US); Todd A. Marquart, Boise, ID (US); Mark A. Helm, Santa Cruz, CA (US); Gil Golov, Backnang (DE); Jeremy Binfet, Boise, ID (US); Carmine Miccoli, Boise, ID (US); Giuseppina Puzzilli, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/846,462

(22) Filed: Jun. 22, 2022

(65) Prior Publication Data

US 2022/0350517 A1 Nov. 3, 2022

Related U.S. Application Data

(63) Continuation of application No. 16/995,682, filed on Aug. 17, 2020, now Pat. No. 11,385,819.

(51) Int. Cl.
*G06F 3/06* (2006.01)

(52) U.S. Cl.
CPC .......... *G06F 3/0644* (2013.01); *G06F 3/0616* (2013.01); *G06F 3/0619* (2013.01);
(Continued)

(58) Field of Classification Search
CPC .... G06F 3/0644; G06F 3/0616; G06F 3/0619; G06F 3/0653; G06F 3/0656; G06F 3/0673
See application file for complete search history.

(56) References Cited

U.S. PATENT DOCUMENTS

| 8,849,104 B2 | 9/2014 | Eder |
| 10,274,948 B2 | 4/2019 | Penilla et al. |

(Continued)

FOREIGN PATENT DOCUMENTS

KR  20190041023 A  4/2019

OTHER PUBLICATIONS

International Search Report and Written Opinion from related PCT Application No. PCT/US2021/044735, dated Nov. 24, 2021, 9 pages.

*Primary Examiner* — Edward J Dudek, Jr.
(74) *Attorney, Agent, or Firm* — Brooks, Cameron & Huebsch, PLLC (57) ABSTRACT

A system includes a processing device and trigger circuitry to signal the processing device responsive, at least in part, based on a determination that a trigger event has occurred. The system can further include a memory device communicatively coupled to the processing device. The memory device can include a cyclic buffer partition portion having a first endurance characteristic and a first reliability characteristic associated therewith. The memory device can further include a snapshot partition portion coupled to the cyclic buffer partition portion via hold-up capacitors. The snapshot partition portion can have a second endurance characteristic and a second reliability characteristic associated therewith. The processing device can perform operations including writing received data sequentially to the cyclic buffer partition portion and writing, based at least in part on the (Continued)

determination that the trigger event has occurred, data from the cyclic buffer partition portion to the snapshot partition portion.

18 Claims, 8 Drawing Sheets

(52) U.S. Cl.
CPC .......... *G06F 3/0653* (2013.01); *G06F 3/0656* (2013.01); *G06F 3/0673* (2013.01)

(56) References Cited

U.S. PATENT DOCUMENTS

| | | |
|---|---|---|
| 11,385,819 B2* | 7/2022 | Muchherla ............ G06F 3/0653 |
| 2012/0014659 A1* | 1/2012 | Hugosson ........ G08B 13/19669 |
| | | 386/E5.069 |
| 2014/0108742 A1* | 4/2014 | Boettiger ............ G06F 12/0862 |
| | | 711/137 |
| 2016/0268000 A1* | 9/2016 | Thompson ............. G11C 16/20 |
| 2017/0372431 A1 | 12/2017 | Perl |
| 2018/0081543 A1 | 3/2018 | Muchherla et al. |
| 2020/0135270 A1 | 4/2020 | Lee et al. |
| 2020/0235942 A1 | 7/2020 | Strong et al. |
| 2020/0242021 A1 | 7/2020 | Gholamiour et al. |
| 2020/0257296 A1 | 8/2020 | Liu et al. |
| 2021/0133500 A1* | 5/2021 | Faller .................. G06K 9/6256 |

\* cited by examiner

SEPARATE PARTITION FOR BUFFER AND SNAPSHOT MEMORY

PRIORITY INFORMATION

This application is a Continuation of U.S. application Ser. No. 16/995,682, filed Aug. 17, 2020, the contents of which are included herein by reference.

TECHNICAL FIELD

Embodiments of the disclosure relate generally to memory systems, and more specifically, relate to separate partition for buffer and snapshot memory.

BACKGROUND

A memory system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to separate partition for buffer and snapshot memory. A memory sub-system can be a storage device, a memory module, or a hybrid of a storage device and memory module. Examples of storage devices and memory modules are described below in conjunction with FIG. 1, et alibi. In general, a host system can utilize a memory sub-system that includes one or more memory devices, such as memory devices that store data. The host system can provide data to be stored at the memory sub-system and can request data to be retrieved from the memory sub-system.

A vehicle can include a memory sub-system, such as a solid state drive (SSD). The memory sub-system can be used for storage of data by various components of the vehicle, such as applications that are run by a host system of the vehicle. One examples of such an application is an event recorder of the vehicle. The event recorder may also be referred to as a "black box" or "accident data recorder".

The emergence of autonomous vehicles, Internet of Things (IoT) and surveillance devices has resulted in a wider gap in between the total bytes written (TBW) in a useable lifetime of a memory sub-system and a user capacity of the memory sub-system. For example, the TBW to user capacity ratio for some memory systems used for such applications has increased by one to three orders of magnitude. Some autonomous vehicles require real time buffering of telemetric data such as video cameras, radar, lidar, ultra-sonic and other sensors that are necessary to playback the sequences preceding an accident. The data from various sensors sums up to a substantial throughput requirement per unit time (e.g., 1 gigabyte per second (GB/sec) sequential write throughput from a host). Upon a trigger event, a quantity of data corresponding to a predetermined playback time immediately preceding the event needs to be captured (e.g., to determine the cause of an accident). The recorded telemetric sensor data corresponding to the predetermined playback time can be referred to as a "snapshot". An event recorder is one such application in where the user capacity requirement could be as low as one hundred and twenty-eight (128) GB, but the TBW requirement could be as high as hundreds of Peta Bytes. The examples of values given are not limiting but highlight the relative difference between the requirements for capacity and TBW. An event recorder may need to store at least a few, most recent snapshots.

Aspects of the present disclosure address the above and other storage challenges for memory sub-system that are used as event recorders by providing systems having TBW to User Capacity (UC) ratios and order of magnitude in a range of 100× to 1000× greater than TBW to US ratios used in, for example, data center designs. For example, a TBW to User Capacity ratio on Data Center drives is typically 2,000, and can be only 1,000 on mobile systems. Embodiments described herein account for system cost and complexity in order to structure and design memory systems that can calibrate and obtain desired parameters, including performance, reliability, and endurance.

The figures herein follow a numbering convention in which the first digit or digits correspond to the drawing figure number and the remaining digits identify an element or component in the drawing. Similar elements or components between different figures may be identified by the use of similar digits. For example, 115 may reference element "15" in FIG. 1, and a similar element may be referenced as 215 in FIG. 2. Analogous elements within a Figure may be referenced with a hyphen and extra numeral or letter. See, for example, elements 614-1, . . . , 614-N in FIG. 1. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
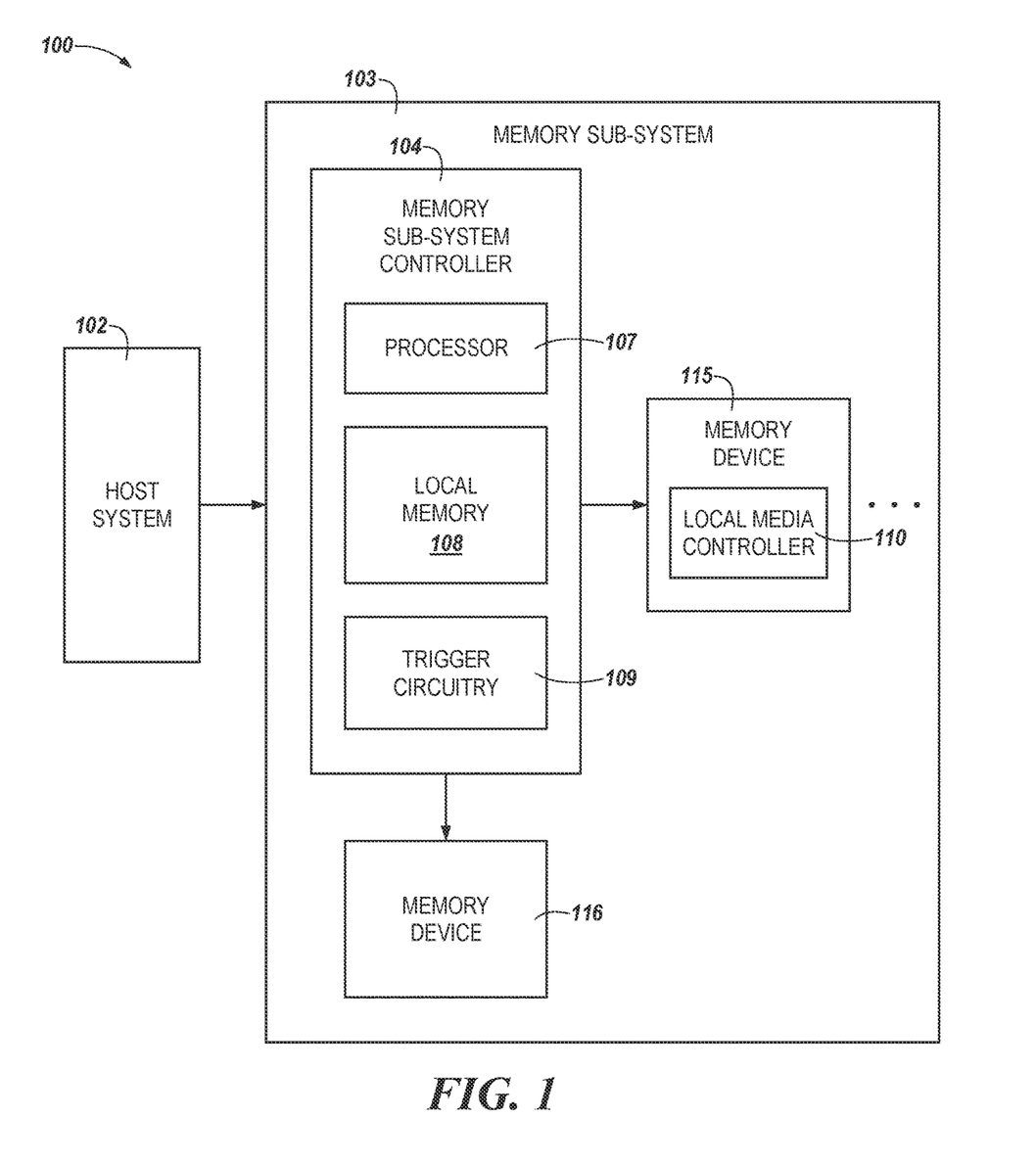
FIG. 1 illustrates an example computing system that includes a memory sub-system in accordance with some embodiments of the present disclosure.

FIG. 1 illustrates an example computing system 100 that includes a memory sub-system 103 in accordance with some embodiments of the present disclosure. The memory sub-system 103 can include media, such as one or more volatile memory devices (e.g., memory device 116), one or more non-volatile memory devices (e.g., memory device 115), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 103. In some embodiments, the host system 102 is coupled to different types of memory sub-systems 103. FIG. 1 illustrates an example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, etc.). The host system 120 uses the memory sub-system 110, for example, to write data to the memory sub-system 110 and read data from the memory sub-system 110.

The host system 102 can be coupled to the memory sub-system 103 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access the memory component (e.g., memory devices 115) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via a same communication connection, multiple separate communication connections, and/or a combination of communication connections.

The memory devices 115, 116 can include any combination of the different types of non-volatile memory devices 115 and/or volatile memory devices 116. The volatile memory devices (e.g., memory device 116) can be, but are not limited to, random access memory (RAM), such as dynamic random access memory (DRAM) and synchronous dynamic random access memory (SDRAM).

Some examples of non-volatile memory devices (e.g., memory device 105) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 115 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 105, 106 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 115, 116 can be grouped as pages that can refer to a logical unit of the memory device used to store data. With some types of memory (e.g., NAND), pages can be grouped to form blocks.

Although non-volatile memory devices 115 such as a 3D cross-point array of non-volatile memory cells and NAND type memory (e.g., 2D NAND, 3D NAND) and 3D cross-point array of non-volatile memory cells are described, the memory device 115 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 104 (or controller 104 for simplicity) can communicate with the memory devices 115 to perform operations such as reading data, writing data, or erasing data at the memory devices 115 and other such operations. The memory sub-system controller 104 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processors.

The memory sub-system controller 104 can be a processing device, which includes one or more processors (e.g., processor 107) configured to execute instructions stored in local memory 108. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code, for example. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive information (e.g., sensor information) or operations from the host system 102 and can convert the information or operations into instructions or appropriate information to achieve the desired access to the memory devices 115 and/or the memory device 116. The memory sub-system controller 104 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 115. The memory sub-system controller 104 can further include host interface circuitry to communicate with the host system 102 via the physical host interface. The host interface circuitry can convert the information (e.g., sensor information) received from the host system into command instructions to access the memory devices 115 and/or the memory device 116 as well as convert responses associated with the memory devices 115 and/or the memory device 116 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory devices 115 and/or memory device 116.

In some embodiments, the memory sub-system controller 104 includes at least a portion of the trigger circuitry 109. For example, the memory sub-system controller 104 can include a processor 107 (processing device) configured to execute instructions stored in local memory 108 for performing the operations described herein. In some embodiments, the trigger circuitry 109 is part of the host system 102, an application, or an operating system.

In some embodiments, the memory devices 115 include a local media controller 110 that operates in conjunction with memory sub-system controller 104 to execute operations on one or more memory cells of the memory devices 115. An external controller (e.g., memory sub-system controller 104) can externally manage the memory device 105 (e.g., perform media management operations on the memory device 115). In some embodiments, a memory device 115 is a managed memory device, which is a raw memory device combined with a local controller (e.g., local controller 110) for media management within the same memory device package. An example of a managed memory device is a managed NAND (MNAND) device.

The memory sub-system controller 104 can also include trigger circuitry 109. As used herein, the trigger circuitry 109 can comprise an ASIC configured to perform the examples described herein. The trigger circuitry 109 can handle information (e.g., sensor information) received in association with a particular event, e.g., a determination and/or detection of an accident associated with an autonomous vehicle. By way of example and not by way of limitation, a determination as may be made when sensor information is equal to or above a particular threshold value. For example, the threshold value may be a predetermined value programmed at a time of manufacture, or the threshold value may be a value set by programming in a field of use after manufacture. The threshold value may be a value relating to a level of pressure indication from a braking sensor on an autonomous vehicle, a deceleration value received from a sensor, a magnitude and timing abruptness change to a steering sensor, and/or indications relating thereto, etc. The trigger circuitry can provide a trigger event signal and provide the event information (e.g., sensor information) to the processor 107. The trigger circuitry 109, in some embodiments, can cause the memory sub-system controller 104 and/or local media controller 110 to perform write actions, e.g., issue write commands, to control host data movement between one memory portion, e.g., cyclic buffer partition portion of a memory device, and the other memory portion, e.g., snapshot partition portion of a memory device, as described according to embodiments herein.

In some embodiments, a local media controller 110 of a memory device 116 includes at least a portion of the trigger circuitry 109. For example, the local media controller 110 can include a processor (e.g., processing device) configured to execute instructions stored on the memory device 116 for performing the operations described herein. In some embodiments, the trigger circuitry 109 is part of the host system 102, an application, or an operating system.

The trigger circuitry 109 can also track a quantity of information (e.g., sensor information) received from a particular event and by the memory sub-system 103. The trigger circuitry 109 can further track a quantity of write operations between one memory portion, e.g., cyclic buffer partition, and the other memory portion, e.g., snapshot partition, performed by the memory devices 115, 116 by each event. The trigger circuitry 109 can further limit the quantity of write operations between one memory portion, e.g., cyclic buffer partition, and the other memory portion, e.g., snapshot partition, performed by the memory devices 115, 116 for each event. If an event exhausts the amount of data that it writes and/or reads, then the trigger circuitry 109 can refrain from providing additional information (e.g., sensor information) received from the event to the processor 107 during a time period.

Figure 2:
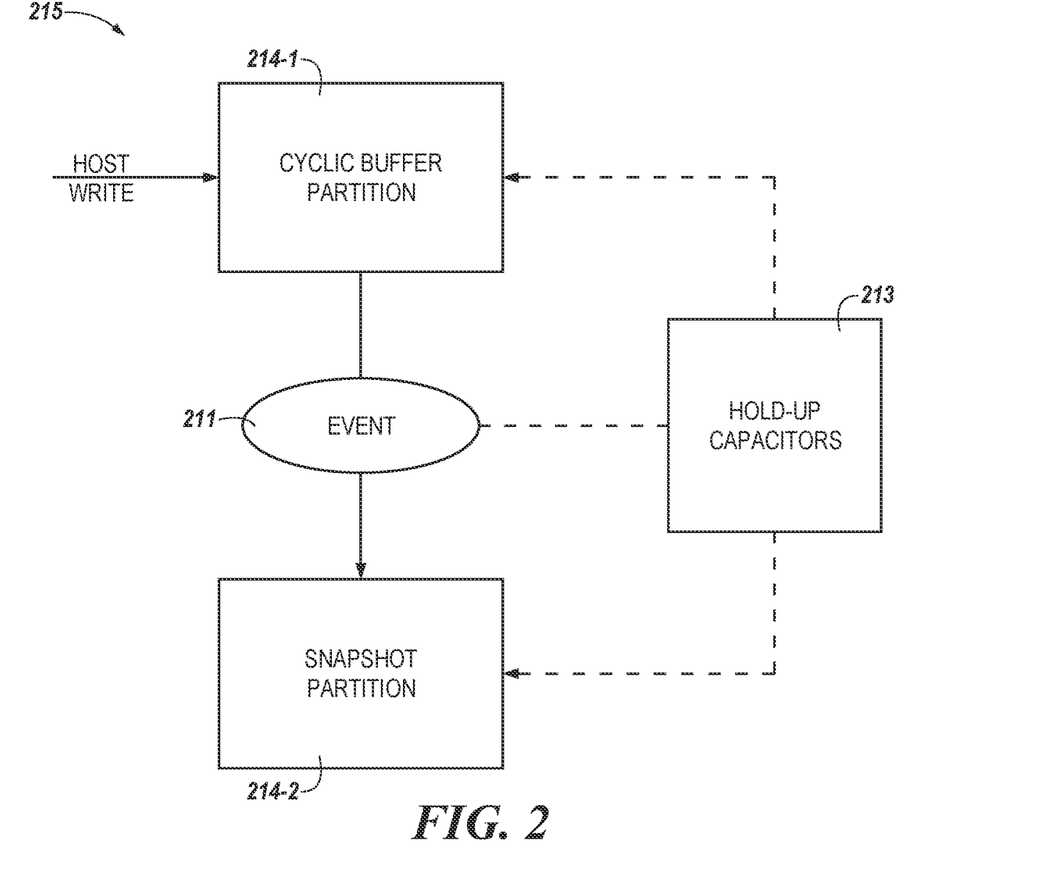
FIG. 2 illustrates an example of a separate partition for buffer and snapshot memory within a memory sub-system in accordance with some embodiments of the present disclosure.

FIG. 2 illustrates an example of a separate partition for buffer 214-1 and snapshot 214-2 memory within a memory device 215 in accordance with some embodiments of the present disclosure. The memory device 215 can be analogous to the memory device 115 illustrated in FIG. 1. In one example, host information, e.g., data, can be received to the memory sub-system 215 at a rate of at least one (1) GigaByte per second (GB/sec.). The host data can be received sequentially to the memory sub-system 215 and stored first in sequence to a partition portion 214-1, e.g., cyclic buffer partition portion, of the memory sub-system 215. In one example, the partition portion 214-1 is sized so that only the last thirty (30) seconds of data is valid. In this example, at a 1 GB/sec. received data bandwidth, the partition portion 214-1 can have a logical size of thirty (30) GigaBytes (GB). As shown in the example of FIG. 2, a partition portion 214-2, e.g., snapshot partition portion, of the memory sub-system 215 can be communicatively coupled to the partition portion 214-1. According to embodiments, based at least in part on a determination that an event has occurred, received host data can be written from the partition portion 214-1 to the partition portion 214-2. In some embodiments, the determination that the event has occurred can include actuation of a trigger signal 211 by trigger circuitry, e.g., trigger circuitry 109 in FIG. 1, based at least in part upon received sensor information from a host that is above a particular threshold, e.g., quantitative value. In some embodiments, the particular threshold can be a predetermined value programmed to the memory sub-system 215 during manufacture of the memory sub-system. In other embodiments, the particular threshold can be a value programmed to the memory sub-system 215 after manufacture of memory sub-system 215, e.g., programmed to the memory sub-system 215 in the field of use.

In the example of FIG. 2, the memory sub-system 215 can write sets of data, sequentially received and stored in the partition portion 214-1, from the partition portion 214-1 to the partition portion 214-2 based at least in part on the determination that the event has occurred. In some embodiments the partition portion 214-2 of the memory sub-system 215 is sized to receive one or more sets of sequentially written data from the partition portion 214-1, e.g., a set of host data being written from the partition portion 214-1 to the partition portion 214-2 each time the determination is made that an event has occurred. In one example the partition portion 214-2 is sized to received at least eight (8) sets of sequentially written data from the partition portion 214-1. In this example, the partition portion 214-2 can have a logical size of two hundred and forty (240) GBs. As used herein, a logical size of the partition portion 214-2 is referred to as "a user capacity" of the memory sub-system.

As shown in the example of FIG. 2, the movement, e.g., writing, of sets of data, sequentially received and stored in the partition portion 214-1, from the partition portion 214-1 to the partition portion 214-2 based at least in part on the determination that the event has occurred, is powered by a non-volatile power supply 213, e.g., a battery power supply such as hold-up capacitors. As shown in the example of FIG. 2, the power supply 213 is communicatively coupled to the partition portion 214-1 and the partition portion 214-2 to supply power to the partition portion 214-1 and the partition portion 214-2 of sufficient duration to write at least a set of data of a particular size, e.g., snapshot size, sequentially received and stored in the partition portion 214-1, from the partition portion 214-1 to the partition portion 214-2.

Thus, if a trigger event to write sets of data, sequentially received and stored in the partition portion 214-1, from the partition portion 214-1 to the partition portion 214-2 is received in connection with a power supply loss to the memory sub-system 215, then a least one set of data of a particular size, e.g., snapshot size, sequentially received and stored in the partition portion 214-1, can be written from the partition portion 214-1 to the partition portion 214-2. In one example, the particular size, e.g., snapshot size, is associated with a reliability of the partition portion 214-1. The reliability of the partition portion 214-1 can be thirty (30) seconds, e.g., a size of the partition portion 214-1 (for host data received at a rate of 30 GB/sec). In such an example, the power supply 213 communicatively coupled to the partition portion 214-1 and the partition portion 214-2, is sized to provide a power supply of sufficient duration to the partition portion 214-1 and the partition portion 214-2 to write the entire partition portion 214-1 to the partition portion 214-2 upon an event that causes an external power supply loss to the memory sub-system 215.

The cyclic buffer portion 222 can store significantly more data over the service life of the non-volatile memory device 216 than the snapshot portion 224. For example, the cyclic buffer portion 222 can store 3-4 orders of magnitude (1,000-10,000 times) more data than the snapshot portion 224. However, the cyclic buffer portion 222 does not have to have a larger storage capacity than the snapshot portion 224. The size (amount of memory) of the cyclic buffer portion 222 can be dependent, at least in part, on an endurance capability of the cyclic buffer portion 222. For example, if a host is expected to write 150 petabytes (PB) of data to the cyclic buffer portion 222 (TBW is 150 PB) and the endurance capability of the cyclic buffer portion 222 is 5 million PEC, then 30 GB of memory for the cyclic buffer portion 222 is sufficient to satisfy the TBW of 150 PB, provided that data stored by the cyclic buffer portion 222 is overwritten. In contrast, if the endurance capability of the cyclic buffer portion 222 is 500 thousand PEC, then 300 GB of memory for the cyclic buffer portion 222 is necessary to satisfy the TBW of 150 PB. Thus, it can be beneficial to improve (increase) an endurance capability of the non-volatile memory device 216 (e.g., an endurance capability of the cyclic buffer portion 222) so that a higher TBW requirement can be satisfied with a smaller amount of memory. Reducing the amount of memory can reduce manufacturing costs, operating costs, and/or improve performance of the non-volatile memory device 216.

In some embodiments the memory sub-system 215 includes a non-volatile memory device, e.g., a negative AND (NAND) memory device and the partition portion 214-1 and the partition portion 214-2 are included in the NAND memory device. In this example, the partition portion 214-1 can be an array of non-volatile memory cells of a particular type and/or programmed according to a particular characteristic, e.g., single level cells (SLCs) in a particular programming mode of operation. The partition portion 214-2 can be an array of non-volatile memory cells of a particular type and/or programmed according to a particular characteristic, e.g., quad-level cells (QLCs) in a particular programming mode of operation. According to embodiments, the partition portion 214-1 has one endurance characteristic and the partition portion 214-2 has the other endurance characteristic. In some embodiments, the endurance characteristic of the partition portion 214-1 is an endurance characteristic that is an order of magnitude of at least six times (6×) greater than the endurance characteristic of the partition portion 214-2. In some embodiments, a ratio of a Total Bytes Written (TBW) quantity to the partition portion 214-1 to a User Capacity (UC) storage size of the partition portion 214-2 is an order of magnitude in a range of 100× to 1000× greater than other applications.

Figure 3:
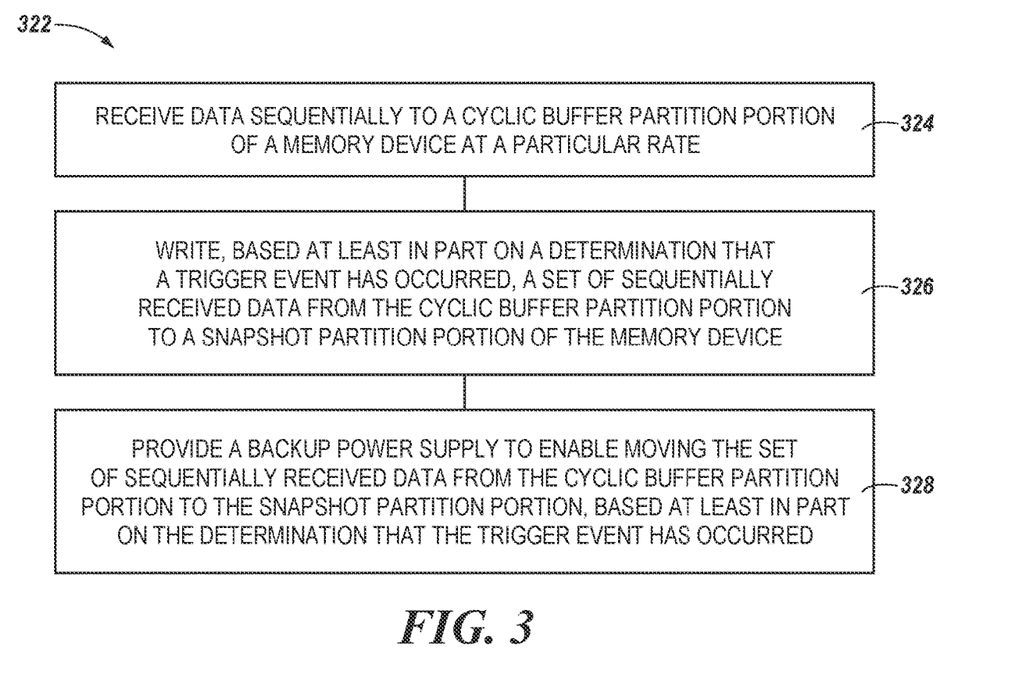
FIG. 3 is a flow diagram of an example method for writing, based at least on a determination that an event has occurred, data among memory portions in accordance with some embodiments of the present disclosure.

FIG. 3 is a flow diagram of an example method 322 for writing, based at least on a determination that an event has occurred, data from one memory partition portion, e.g., 214-1 in FIG. 2, to the other memory partition portion, e.g., 214-2 in FIG. 2, in accordance with some embodiments of the present disclosure. The method 322 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 322 is performed by the memory sub-system controller 104, processing device 107, trigger circuitry 109, memory device 115 and/or 116, and/or local media controller 110 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 324 in the example method 322 of FIG. 3, the method 322 includes receiving data sequentially to a first non-volatile memory partition portion of a memory device at a particular rate, for example, one (1) GigaByte per second (1 GB/sec). The data sequentially received at the first non-volatile memory partition portion can be multiple sets of data sequentially received at the first non-volatile memory partition portion. While the multiple sets of data are sequentially received, data within each set can be written to the first non-volatile memory partition portion in a non-sequential manner. According to embodiments receiving data sequentially to first non-volatile memory partition portion of a memory device includes operating a first non-volatile memory partition, having a first endurance and a first reliability, to receive at least one (1) GB/second of sequential write data. In some embodiments, operating a first non-volatile memory partition includes receiving data sequentially to a cyclic buffer partition portion of a negative AND (NAND) memory device at a rate of one (1) GB/sec. In some embodiments, the first endurance wherein the first endurance of the first non-volatile memory partition is an order of magnitude greater than the second endurance of the second non-volatile memory partition. Although embodiments are not so limited, the first endurance can be an order of magnitude of at least four times (4×) greater than the second endurance.

At block 326, the method 322 includes moving (e.g., writing), based at least in part on a determination that a trigger event has occurred, a set of sequentially received data from the first non-volatile memory partition portion to a second non-volatile memory partition portion of the memory device. According to embodiments, moving a set of sequentially received data from the first non-volatile memory partition portion to the second non-volatile memory partition portion includes operating a second non-volatile memory partition having a second endurance and a second reliability to receive sets of the sequential write data from the first non-volatile memory partition. In some embodiments, the first endurance of the first non-volatile memory partition is an order of magnitude greater than the second endurance of the second non-volatile memory partition. In some embodiments, moving a set of sequentially received data from the first non-volatile memory partition portion to the second non-volatile memory partition portion includes operating a second non-volatile memory partition having a size to store, one or more e.g., at least eight (8), different sets of received data, sequentially from first non-volatile memory partition portion. In some embodiments, moving a set of sequentially received data from the first non-volatile memory partition portion to the second non-volatile memory partition portion includes moving a set of sequentially received data that has a size that matches a time period associated with the first reliability.

At block 328, the method 322 includes providing a backup power supply to move the sets of the sequential write data from the first non-volatile memory partition, based at least in part on the detection of that the trigger event has occurred. For example, in some embodiments operating the first non-volatile memory and the second non-volatile memory includes operating the first and the second non-volatile memory to receive sequential sensor data associated with an autonomous vehicle.

According to the example method 322 in FIG. 3, In some embodiments, operating the first non-volatile memory partition comprises operating the first non-volatile memory partition to have a Total Bytes Written (TBW) quantity is for a lifetime system specification on an autonomous vehicle host. In some embodiments, operating the first non-volatile memory partition comprises operating the first non-volatile memory partition to have a Total Bytes Written (TBW) quantity that is an order of magnitude of at least six times (6×) greater than a TBW quantity to the second non-volatile memory partition.

Figure 4:
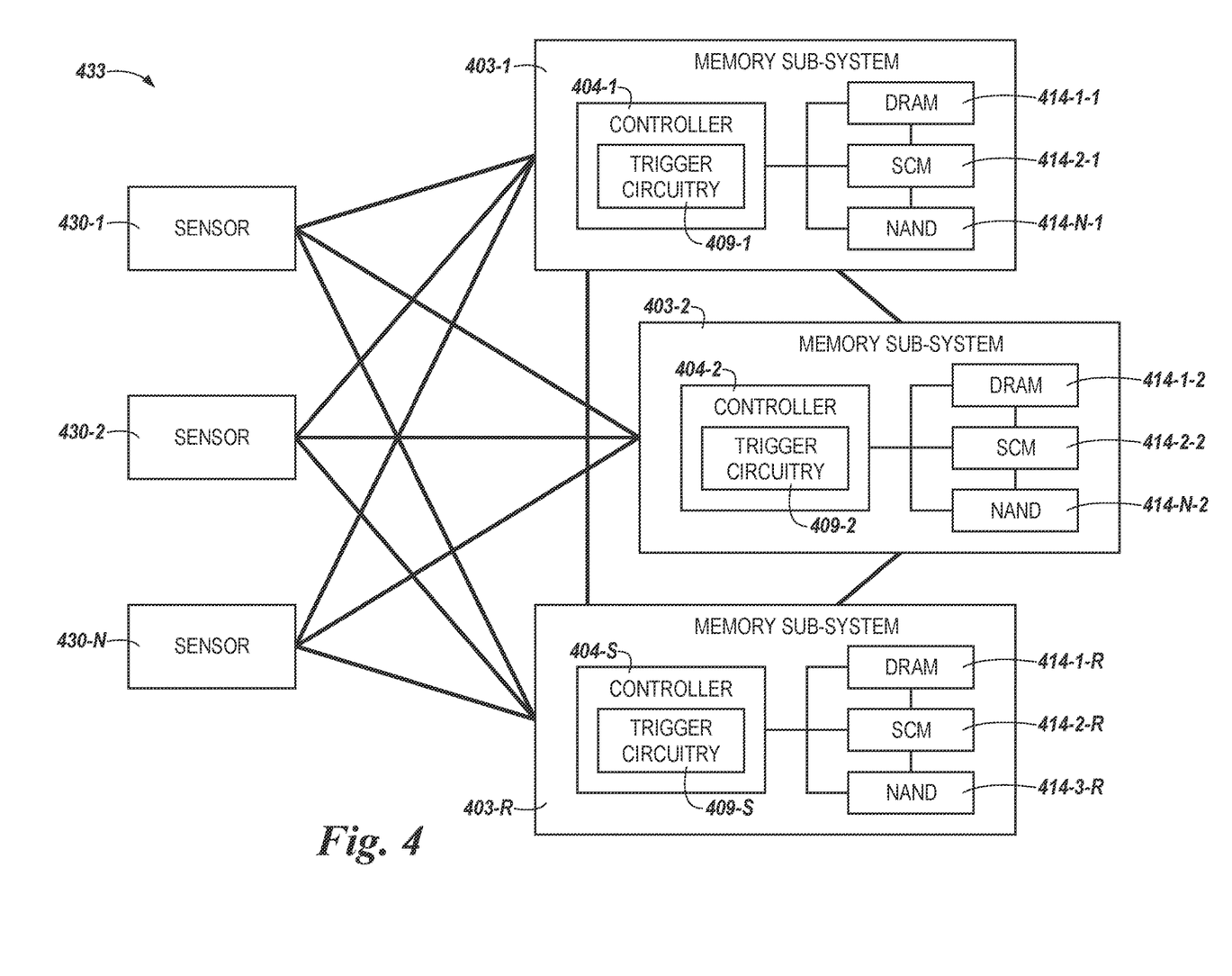
FIG. 4 illustrates an example computing system including one or more sensors communicatively coupled to one or more memory sub-systems in accordance with a some embodiments of the present disclosure.

FIG. 4 is functional block diagram in the form of a computing system 433 including one or more memory sub-systems 403-1, 403-2, 403-R communicatively coupled with one or more sensors 430-1, 430-2, 430-N in accordance with a number of embodiments of the present disclosure. As used herein, the sensors 430-1, 430-2, 430-N can be collectively and/or independently referred to as the "sensor(s) 430". The memory sub-systems 403-1, 403-2, 403-R can be collectively and/or independently referred to herein as "memory sub-system(s) 403" and be analogous to the memory system 104 described in connection with FIG. 1. Each of the memory sub-system(s) 403 can respectively include a controller (e.g., processing device) 404-1, 404-2, and 404-S. The controller(s) 404-1, 404-2, and 404-S can be collectively and/or independently referred to herein as "controllers 404" and be analogous to the controller 104 described in connection with FIG. 1. The controllers 404 can further include trigger circuitry 409-1, 409-2, and 409-3 respectively within the controller 404-1, 404-2, and 404-3. As described herein, the trigger circuitry 409-1, 409-2, and/or 409-3, in some embodiments, can cause the controllers 404 to perform write actions, e.g., issue write commands, to control host data movement between one memory portion (e.g., cyclic buffer partition portion 241-1 illustrated in FIG. 2), and the other memory portion (e.g., snapshot partition portion 214-2 illustrated in FIG. 2). Each of the controllers 404 can be communicatively coupled to a memory sub-system 403 (e.g., and various types of volatile and/or non-volatile memory devices 414-1-1, 414-1-2, . . . , 414-3-R).

For example, memory sub-system 403-1 can include controller 404-1 and memory devices 414-1-1, 414-2-1, and 414-N-1. Memory sub-system 403-2 can include controller 404-2 and memory devices 414-1-2, 414-2-2, ..., 414-N-2 (e.g., DRAM device 414-1-2, SCM device 414-2-2, and NAND device 414-N-2). Memory sub-system 403-R can include controller 404-S and memory devices 414-1-R, 414-2-R, 414-3-R. Memory devices can be the same type of memory device and/or different memory device types (e.g., example, DRAM device 414-1-R, SCM device 414-2-R, NAND device 414-3-R, etc.). Embodiments are not so limited, however, and each memory system 403 can include any number and combination of memory devices.

The embodiment of FIG. 4 illustrates an example of a computing system 433 in which each sensor 430 is communicatively coupled to each memory sub-system 403, and each memory sub-system 403-1, 403-2, and 403-R is communicatively coupled to each other. Although not illustrated as to not obscure the examples of the disclosure, the sensors 430 and the memory sub-system(s) 403 can be communicatively coupled to a host (e.g., an autonomous vehicle).

In a non-limiting embodiment where the host is a vehicle, and a sensor 430-1 is a camera sensor, a sensor 430-2 is a temperature sensor, and a sensor 430-N is acoustic sensor, the memory system 403 can receive information/data from all of the sensors 430. A memory system 403-1 can be related to a braking system embedded unit of the vehicle and can have data attributes related to the camera sensor 430-1, the temperature sensor 430-2 or the acoustic sensor 430-N. In another example, a memory system 403-2 can be related to a heating/cooling embedded unit and data from temperature sensor 430-2- and/or the acoustic sensor 430-N. In yet another example, a memory device 403-R can be related to an ambient noise embedded unit a having information related to the acoustic sensor 430-N Each of the controllers 404 can receive data from each of the sensors 430 as the sensors 430 generate the data. Each of the controllers 404 can store the data sequentially in a memory device and the controller 404, e.g., a processing device, can execute instructions associated with a machine learning algorithm to iteratively compare and analyze the received sensor information, e.g., data. For example, the controller 404-1 can receive data from each of the sensors 430-1, 430-2, and 430-N. The controller 404-1 can determine information about sensor information where the information of the sensors 430 are related to a function, a location relative to the host, etc. For example, the controller 404-1, for example, can receive data from the camera sensor 430-1 and determine the sensor information is related to an image included in the data saved in memory device(s) 414-1. 418- and/or 416-1. Further, the memory sub-system 403-1 can compare the sensor information received in current time with sensor information, e.g., data, received in different periods of time and process it via machine learning. Based on the processed, analyzed, and/or learned information the host can signal trigger circuitry associated with a memory sub-system, e.g., trigger circuitry 109 in memory sub-system 103 in FIG. 1, to perform memory sub-system control operations described herein.

In another example, the controller 404-S can receive data from each of the sensors 430-1, 430-2, and 430-N. The controller 404-S can determine sensor information received from host where the information is related to an acoustic function of the sensors 430. Specifically, the controller 404-S can receive sensor information from the sensor 430-N (e.g., an acoustic sensor) and determine the information about the sensor information is related to audio information included in the data. The controller 404-S can compare the audio information received in current time with audio information received in different periods of time and process the information via machine learning. Again, based on the processed, analyzed, and/or learned information the host can signal trigger circuitry associated with a memory sub-system, e.g., trigger circuitry 109 in memory sub-system 103 in FIG. 1, to perform memory sub-system control operations described herein.

Figure 5:
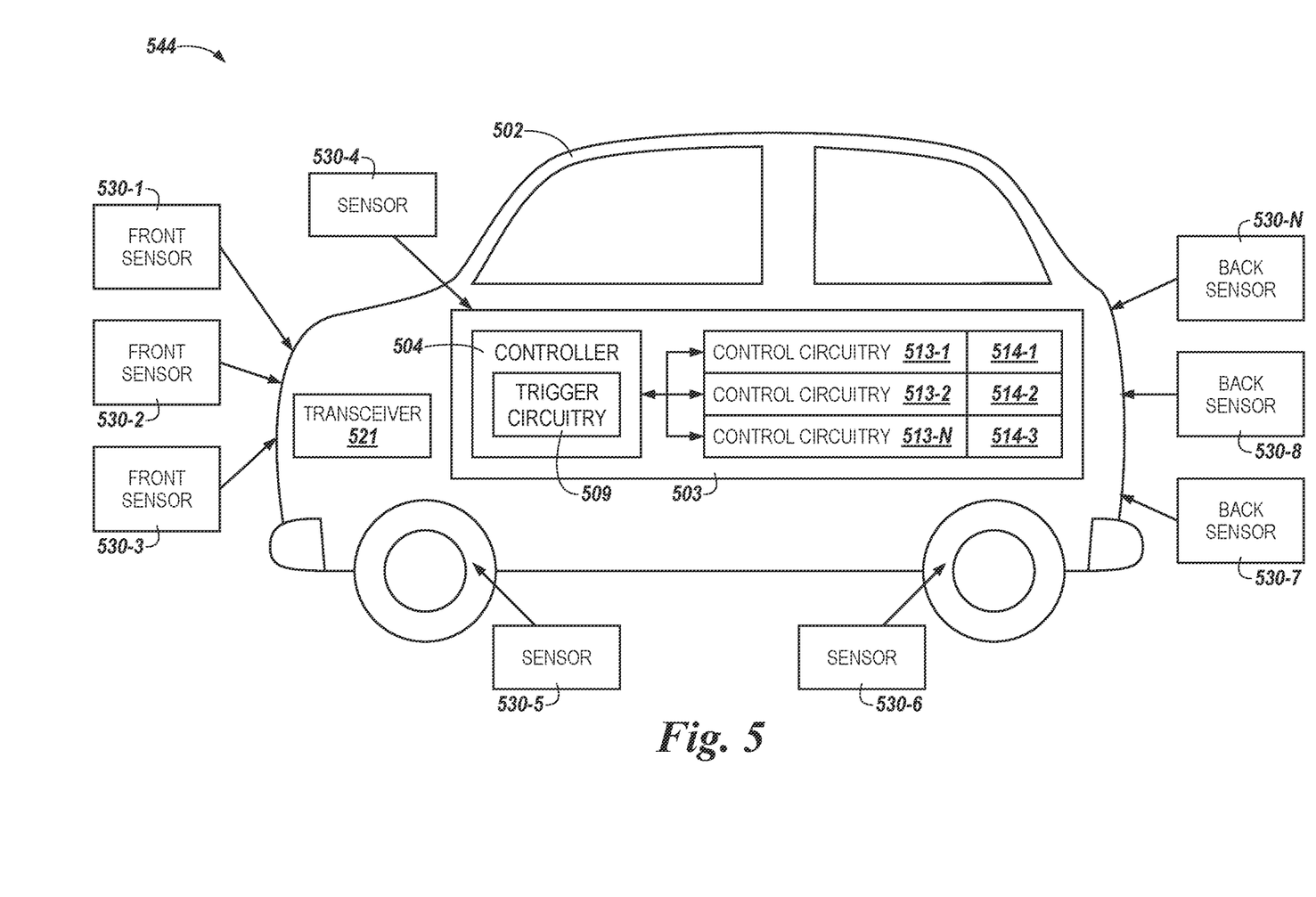
FIG. 5 illustrates an example of a computing system including a memory sub-system deployed on a host in the form of a vehicle in accordance with some embodiments of the present disclosure.

FIG. 5 is a diagram of a computing system 544 including a memory sub-system 503 deployed on a host 502 in the form of a vehicle in accordance with a number of embodiments of the present disclosure. The host 502 can include a host controller 504 which can be analogous to controller 404 described in connection with FIG. 4. The controller 504 can further include trigger circuitry 509 which can be analogous to the trigger circuitry described in connection with FIG. 1. As described herein, the trigger circuitry 509, in some embodiments, can cause the controller 504 to perform write actions, e.g., issue write commands, to control host data movement between one memory portion (e.g., cyclic buffer partition portion 241-1 illustrated in FIG. 2), and the other memory portion (e.g., snapshot partition portion 214-2 illustrated in FIG. 2). The host 502 can be communicatively coupled to sensors 530-1, 530-2, 530-3, ..., 530-7, 530-8, 530-N which can be collectively and/or independently referred to as the "sensor(s) 530" and be analogous to sensors 530 described in connection with FIG. 4. The memory sub-system 503 can be analogous to memory sub-system 114 described in connection with FIG. 1 and include one or more media devices. The memory sub-system 503 can include a memory device 514-1 (e.g. DRAM) including control circuitry 513-1 a memory device 514-2 (e.g., SCM) including control circuitry 513-2, and/or a memory device 513-3 (e.g., NAND) including control circuitry 513-N. Embodiments are not so limited, however, and memory system 503 can include any number or combination of memory devices (e.g., non-volatile and/or volatile).

The computing system 544, and thus the host 502, can be coupled to a number of sensors 530 either directly, as illustrated for the sensor 530-4 or via a transceiver 521 as illustrated for the sensors 530-1, 530-2, 530-3, 530-5, 530-6, 530-7, 530-8, ..., 530-N. The transceiver 521 is able to receive time based telemetric sensor data from the sensors 530 wirelessly, such as by radio frequency communication. In at least one embodiment, each of the sensors 530 can communicate with the computing system 544 wirelessly via the transceiver 521.

The example host 502 is in the form of a vehicle. A vehicle can include a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, and/or anything used for transporting people and/or goods. The sensors 530 are illustrated in FIG. 5 as including their attributes. For example, sensors 530-1, 530-2, and 530-3 can be camera sensors collecting data from the front of the vehicle host 502. Sensors 530-4, 530-5, and 530-6 are microphone sensors collecting data from the from the front, middle, and back of the vehicle host 502. The sensors 530-7, 530-8, and 530-N are camera sensors collecting data from the back of the vehicle host 502.

The host controller 504 can be a controller designed to assist in automation endeavors of a vehicle host 502. For example, the host controller 504 can be an advanced driver assistance system controller (ADAS). An ADAS can monitor data to prevent accidents and provide warning of potentially unsafe situations. For example, the ADAS can monitor sensors in a vehicle host 502 and take control of the vehicle host 502 operations to avoid accident or injury (e.g., to avoid accidents in the case of an incapacitated user of a vehicle). A host controller 504 such as an ADAS can need to act and make decisions quickly to avoid accidents. The memory sub-system 503, e.g., memory system, can store reference data in memory devices such that new data received from the sensors 530 can be compared to the reference data such that quick decisions can be made by the host controller 504.

The reference data stored in the memory sub-systems can be data that the host controller 504 has determined is relevant to the host 502. Reference data can be data aggregated from sensors 530 over a period of time. For example, the reference data associated with the front sensors 530-1, 530-2, 530-3 can include data collected of a route frequently traversed by the vehicle host 502. In this way, when the vehicle host 502 is traveling forward, the front sensors 530-1, 530-2, and 530-3 can transmit information to the host controller 504. The host controller 504 can compare and/or analyze the new data received to reference data stored, process by executing instructions associated with a machine learning algorithm and, based at least in part on the comparison and/or analysis, determine an instructive action. The Instructive action can include predictive action, based new information being received for the first time relevant to the location of the vehicle on the roadway. The instructive action can include a preventative action based on previous experience received in different periods of time relevant to the location of the vehicle on the roadway.

Figure 6:
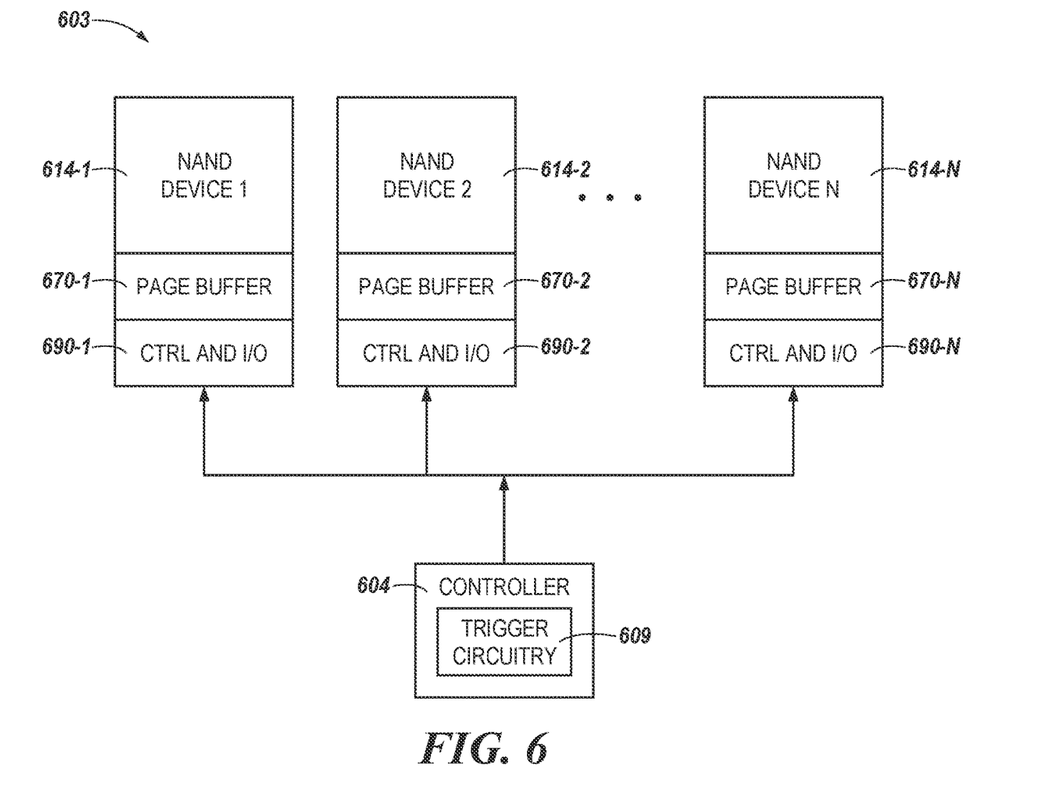
FIG. 6 illustrates a block diagram of a portion of a memory sub-system having one or more negative AND (NAND) memory devices communicatively coupled together in accordance with some embodiments of the present disclosure.

FIG. 6 is a block diagram of a portion of a memory device 614 having one or more negative AND (NAND) memory devices communicatively coupled together in accordance with some embodiments of the present disclosure. Memory device 614 can be, for instance, memory device 114-1 previously described in connection with FIG. 1. The controller 604 can be analogous to the memory sub-system controller 104 illustrated in FIG. 1. The controller 604 can further include trigger circuitry 609 respectively within the controller 604. As described herein, the trigger circuitry 609, in some embodiments, can cause the controller 604 to perform write actions, e.g., issue write commands, to control host data movement between one memory portion (e.g., cyclic buffer partition portion 241-1 illustrated in FIG. 2), and the other memory portion (e.g., snapshot partition portion 214-2 illustrated in FIG. 2).

As shown in FIG. 6, memory sub-system 603 can include NAND flash memory devices 614-1, 614-2, . . . , 613-N having NAND memory arrays which can be analogous to memory array 730 as described in connection with FIG. 7. For instance, the arrays of each respective NAND device 614-1, 614-2, . . . , 614-N can include NAND flash memory cells arranged in rows coupled by access lines (e.g., word lines) and columns coupled by sense lines (e.g., bit lines). The rows and columns can be addressed by row and address decoders and/or partitioned accordingly into physical and/or logical groups.

As shown in FIG. 6, memory device 614 can include page buffers 670-1, 670-2, . . . , 670-N. Page buffers 670 can perform arithmetic functions and logical operations to execute data queries. Further, memory device 630 can include I/O circuitry 690-1, 690-2, . . . , 690-N, as illustrated in FIG. 6. Each respective page buffer 670 and I/O circuitry 690 can be formed on the same chip as a different one of NAND flash devices 614. For instance, as illustrated in FIG. 6, page buffer 670-1 and I/O circuitry 690-1 can be formed on NAND device 614-1, page buffer 670-2 and I/O circuitry 690-2 can be formed on NAND device 614-2, etc.

As shown in FIG. 6, memory device 603 can include a controller 604, which can be analogous to controller 104 and/or 110 previously described in connection with FIG. 1. For instance, controller 604 can control page buffers 670, and control access of NAND devices 614, via I/O circuitry 690. For instance, controller 604 can control page buffer 670-1 and control access of NAND device 614-1 via I/O circuitry 690-1, controller 604 can control page buffer 670-1 and control access of NAND device 614-2 via I/O circuitry 690-2, etc.

Figure 7:
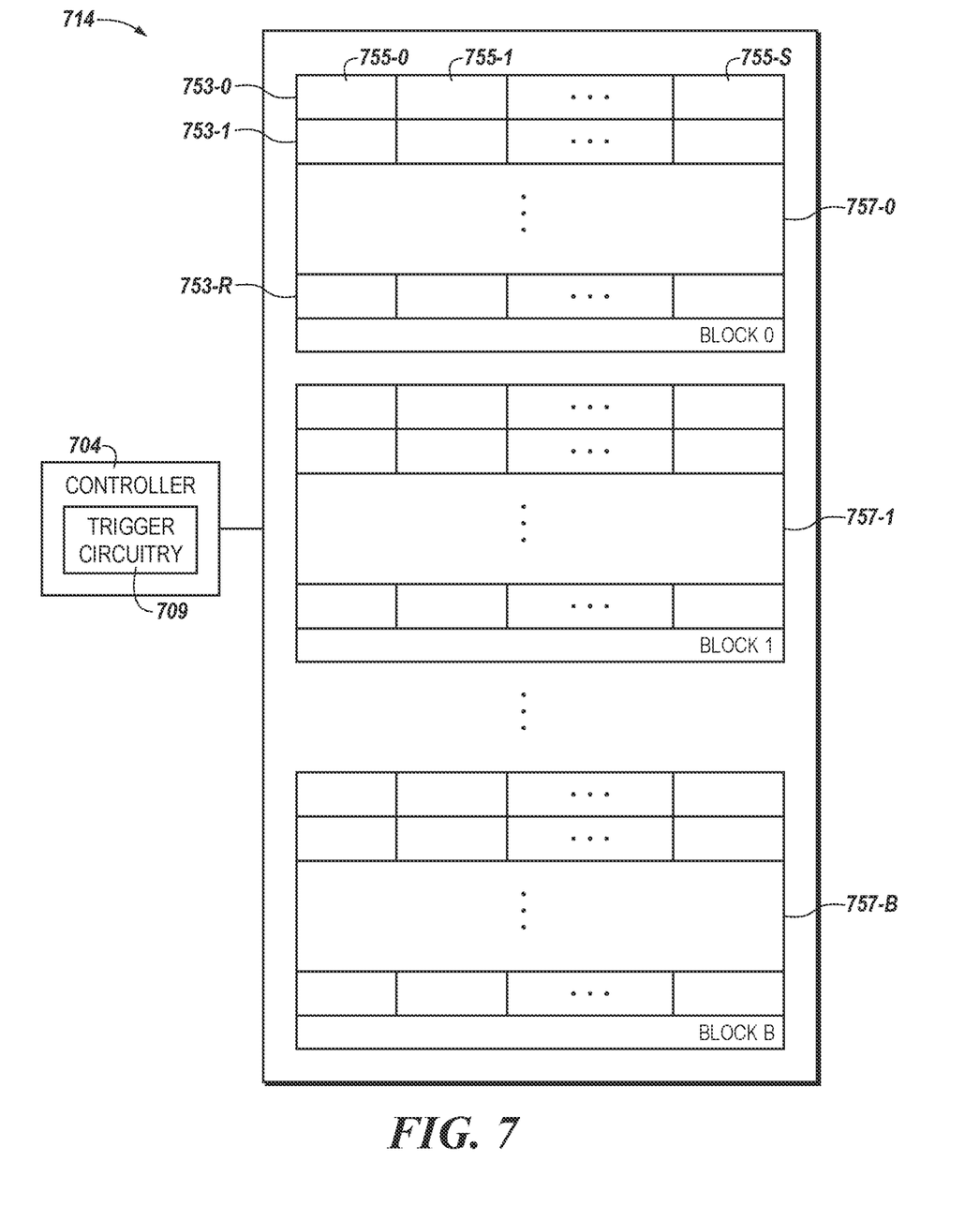
FIG. 7 illustrates a diagram of a portion of a memory array having a number of physical blocks and coupled to a memory sub-system controller in accordance with some embodiments of the present disclosure.

FIG. 7 illustrates a diagram of a portion of a memory array 714 having a number of physical blocks and coupled to a memory sub-system controller 704 in accordance with an embodiment of the present disclosure. The memory sub-system controller 704 can be analogous to the memory sub-system controller 104 illustrated in FIG. 7. The controller 704 can further include trigger circuitry 709. As described herein, the trigger circuitry 709, in some embodiments, can cause the memory sub-system controllers 704 to perform write actions, e.g., issue write commands, to control host data movement between one memory portion (e.g., cyclic buffer partition portion 241-1 illustrated in FIG. 2), and the other memory portion (e.g., snapshot partition portion 214-2 illustrated in FIG. 2).

Memory array 714 can be, for example, a NAND flash memory array. As an additional example, memory array 714 can be a storage class memory (SCM) array, such as, for instance, a three-dimensional cross-point (3D XPoint) memory array, a ferroelectric RAM (FRAM) array, or a resistance variable memory array such as a PCRAM, RRAM, or spin torque transfer (STT) array, among others. Further, although not shown in FIG. 7, memory array 714 can be located on a particular semiconductor die along with various peripheral circuitry associated with the operation thereof.

As shown in FIG. 7, memory array 714 has a number of physical blocks 757-0 (BLOCK 0), 757-1 (BLOCK 1), . . . , 757-B (BLOCK B) of memory cells. The memory cells can be operated and/or programmed according to a particular programming characteristic, e.g., programming mode, as single level cells and/or multilevel cells such as, for instance, two level cells, triple level cells (TLCs) or quadruple level cells (QLCs), and/or penta-level cells (PLC). As an example, the number of physical blocks in memory array 714 can be 128 blocks, 512 blocks, or 1,024 blocks, but embodiments are not limited to a particular power of two or to any particular number of physical blocks in memory array 714.

A number of physical blocks of memory cells (e.g., blocks 757-0, 757-1, . . . , 757-B) can be included in a plane of memory cells, and a number of planes of memory cells can be included on a die. For instance, in the example shown in FIG. 7, each physical block 757-0, 757-1, . . . , 757-B can be part of a single die. That is, the portion of memory array 714 illustrated in FIG. 7 can be a die of memory cells.

As shown in FIG. 7, each physical block 757-0, 757-1, . . . , 757-B includes a number of physical rows (e.g., 753-0, 753-1, . . . , 753-R) of memory cells coupled to access lines (e.g., word lines). The number of rows (e.g., word lines) in each physical block can be 32, but embodiments are not limited to a particular number of rows 753-0, 753-1, . . . , 753-R per physical block. Further, although not shown in FIG. 7, the memory cells can be coupled to sense lines (e.g., data lines and/or digit lines).

As one of ordinary skill in the art will appreciate, each row 753-0, 753-1, . . . , 753-R can include a number of pages of memory cells (e.g., physical pages). A physical page refers to a unit of programming and/or sensing (e.g., a number of memory cells that are programmed and/or sensed together as a functional group). In the embodiment shown in FIG. 7, each row 753-0, 753-1, . . . , 753-R comprises one physical page of memory cells. However, embodiments of the present disclosure are not so limited. For instance, in an embodiment, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 7, a page of memory cells can comprise a number of physical sectors 755-0, 755-1, . . . , 755-S (e.g., subsets of memory cells). Each physical sector 755-0, 755-1, . . . , 755-S of cells can store a number of logical sectors of data. Additionally, each logical sector of data can correspond to a portion of a particular page of data. As an example, one logical sector of data stored in a particular physical sector can correspond to a logical sector corresponding to one page of data, and the other logical sector of data stored in the particular physical sector can correspond to the other page of data. Each physical sector 755-0, 755-1, . . . , 755-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA can also correspond (e.g., dynamically map) to a physical address, such as a physical block address (PBA), that can indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 757-0, 757-1, . . . , 757-B, rows 753-0, 753-1, . . . , 753-R, sectors 755-0, 755-1, . . . , 755-S, and pages are possible. For example, rows 753-0, 753-1, . . . , 753-R of physical blocks 757-0, 757-1, . . . , 757-B can each store data corresponding to a single logical sector which can include, for example, more or less than 512 bytes of data.

Memory devices such as NAND devices 614 in FIG. 6 and memory arrays 714 in FIG. 7 can be partitioned using addresses to delineate pages, blocks, etc. Operational parameters, e.g., trim settings, such as programming voltages, programming frequency, and/or programming time length (tPROG) can be controlled and/or adjusted according to different partitions and/or partition portions delineated in memory devices and/or memory sub-systems, e.g., 101 in FIG. 1, by addresses.

Figure 8:
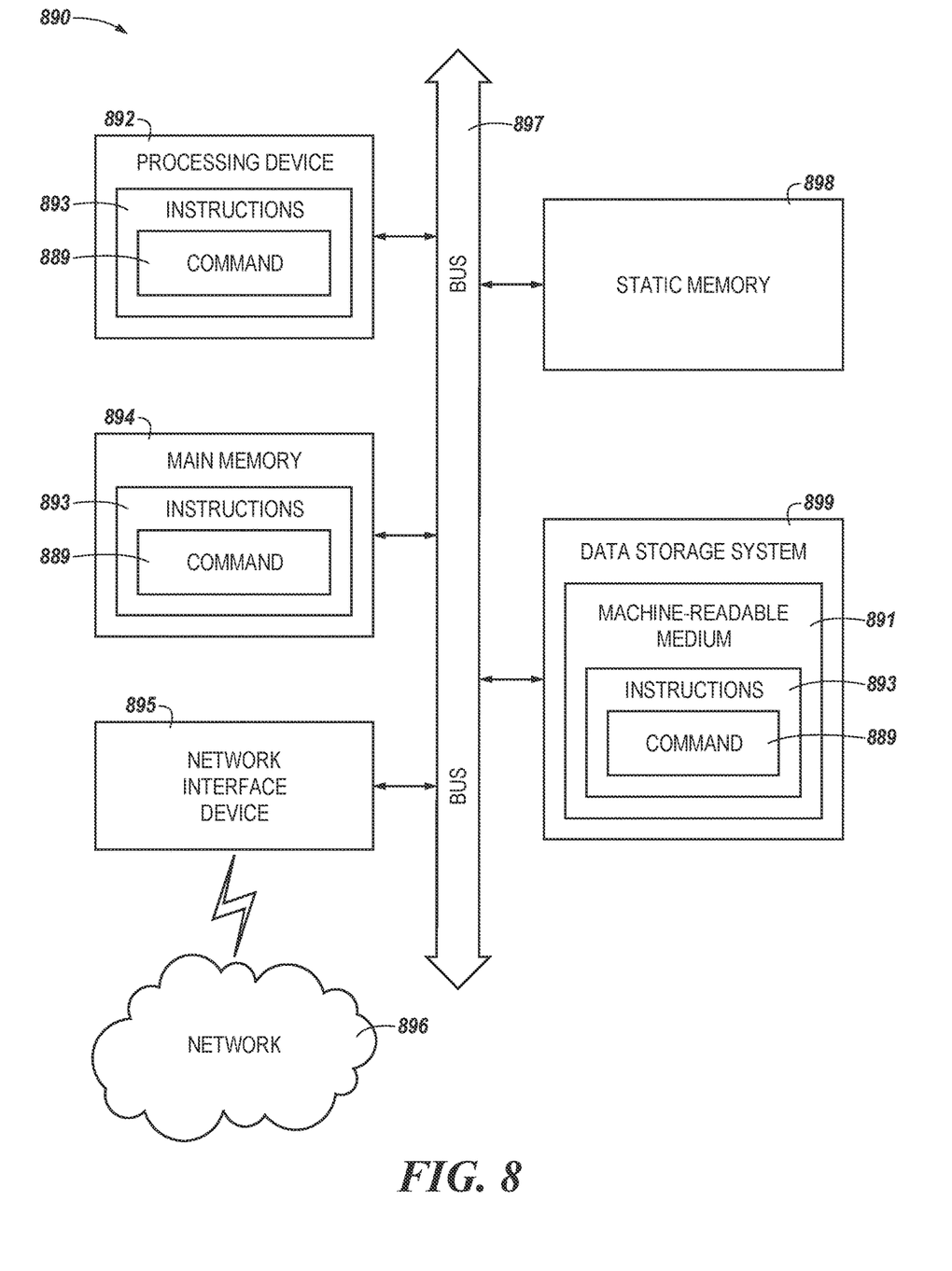
FIG. 8 is a block diagram of an example computer system in which embodiments of the present disclosure may operate.

FIG. 8 illustrates an example machine of a computer system 890 within which a set of instructions, for causing the machine to perform one or more of the methodologies discussed herein, can be executed. In some embodiments, the computer system 890 can be analogous to the memory sub-system controller 104 of FIG. 1. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 890 includes a processing device 892, a main memory 894 (e.g., read-only memory (ROM), flash memory, dynamic random access memory (DRAM) such as synchronous DRAM (SDRAM) or resistive DRAM (RDRAM), etc.), a static memory 898 (e.g., flash memory, static random access memory (SRAM), etc.), and a data storage system 899, which communicate with each other via a bus 897.

The processing device 892, which can be analogous to the processor 107 in FIG. 1, represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 892 can also be one or more special-purpose processing devices such as an application specific integrated circuit (ASIC), a field programmable gate array (FPGA), a digital signal processor (DSP), network processor, or the like. The processing device 892 is configured to execute instructions 893 for performing the operations and steps discussed herein. The computer system 890 can further include a network interface device 895 to communicate over the network 896.

The data storage system 899 can include a machine-readable storage medium 891 (also known as a computer-readable medium) on which is stored one or more sets of instructions 893 or software embodying one or more of the methodologies or functions described herein. The instructions 893 can also reside, completely or at least partially, within the main memory 894 and/or within the processing device 892 during execution thereof by the computer system 890, the main memory 894 and the processing device 892 also constituting machine-readable storage media. The machine-readable storage medium 891, data storage system 899, and/or main memory 894 can correspond to the memory sub-system 103 of FIG. 1.

In one embodiment, the instructions 893 include instructions to implement functionality corresponding to the trigger circuitry 109 of FIG. 1. The instructions can include a command instruction 889 associated with performing event trigger signals for host data received (e.g., sensor information) and sending signals and/or instructions to a memory sub-system (e.g., trigger circuitry 109 in memory sub-system 103 of FIG. 1). While the machine-readable storage medium 891 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a processing device;
   trigger circuitry to signal the processing device responsive, at least in part, based on a determination that a trigger event has occurred; and
   a memory device communicatively coupled to the processing device and comprising:
      a cyclic buffer partition portion having a first endurance characteristic and a first reliability characteristic associated therewith; and
      a snapshot partition portion coupled to the cyclic buffer partition portion via hold-up capacitors, the snapshot partition portion having a second endurance characteristic and a second reliability characteristic associated therewith,
      wherein the cyclic buffer partition portion and the snapshot partition portion are non-volatile memory;
   wherein the processing device is to perform operations comprising:
      writing received data sequentially to the cyclic buffer partition portion to provide real time buffering of the received data such that older received data is overwritten with newly received data after a capacity of the cyclic buffer partition portion is reached; and
      writing, based at least in part on the determination that the trigger event has occurred, data from the cyclic buffer partition portion to the snapshot partition portion.

2. The system of claim 1, wherein the trigger event is a signal received above a threshold as detected by a sensor on a host.

3. The system of claim 1, wherein the processing device is to operate the cyclic buffer partition portion as a first-in-first-out (FIFO) buffer.

4. The system of claim 3, wherein the received data is written to the cyclic buffer partition portion in sets, each set corresponding to a snapshot size.

5. The system of claim 1, wherein the system comprises an event recorder of a vehicle.

6. The system of claim 5, wherein the received data comprises telemetric sensor data.

7. A method, comprising:
   receiving data sequentially to a cyclic buffer partition portion of a memory device at a particular rate to provide real time buffering of the received data such that older received data is overwritten with newly received data after a capacity of the cyclic buffer partition portion is reached;
   writing, based at least in part on a determination that a trigger event has occurred, a set of sequentially received data from the cyclic buffer partition portion to a snapshot partition portion of the memory device, wherein the cyclic buffer partition portion and the snapshot partition portion are non-volatile memory; and providing a backup power supply to enable moving the set of sequentially received data from the cyclic buffer partition portion to the snapshot partition portion, based at least in part on the determination that the trigger event has occurred.

8. The method of claim 7, wherein the method further comprises operating the cyclic buffer partition portion as a first-in-first-out (FIFO) buffer such that data newly received at the cyclic buffer partition portion replaces older data in the cyclic buffer partition portion.

9. The method of claim 8, wherein the set of sequentially received data is one of a plurality of sets of data written to the snapshot partition portion, each one of the plurality of sets corresponding to a particular size.

10. The method of claim 7, wherein the trigger event is a signal received above a threshold as detected by a sensor on a host.

11. The method of claim 10, wherein the received data comprises telemetric sensor data.

12. A non-transitory machine readable medium storing instructions executable by a processing device to:
  receive data sequentially to a cyclic buffer partition portion of a memory device at a particular rate to provide real time buffering of the received data such that older received data is overwritten with newly received data after a capacity of the cyclic buffer partition portion is reached;
  write, based at least in part on a determination that a trigger event has occurred, a set of sequentially received data from the cyclic buffer partition portion to a snapshot partition portion of the memory device, wherein the cyclic buffer partition portion and the snapshot partition portion are non-volatile memory; and
  provide a backup power supply to enable moving the set of sequentially received data from the cyclic buffer partition portion to the snapshot partition portion, based at least in part on the determination that the trigger event has occurred.

13. The medium of claim 12, further comprising instructions to operate the cyclic buffer partition portion as a first-in-first-out (FIFO) buffer such that data newly received at the cyclic buffer partition portion replaces older data in the cyclic buffer partition portion.

14. The medium of claim 13, wherein the set of sequentially received data is one of a plurality of sets of data written to the snapshot partition portion, each one of the plurality of sets corresponding to a particular size.

15. The medium of claim 12, wherein the trigger event is a signal received above a threshold as detected by a sensor on a host.

16. The medium of claim 12, wherein the instructions comprise instructions to provide an event recorder of a vehicle.

17. The medium of claim 16, wherein the received data comprises telemetric sensor data of the vehicle.

18. The medium of claim 16, wherein the vehicle is an autonomous vehicle.

* * * * *